(12) United States Patent
Gass et al.

(10) Patent No.: US 7,171,879 B2
(45) Date of Patent: Feb. 6, 2007

(54) DISCRETE PROXIMITY DETECTION SYSTEM

(75) Inventors: Stephen F. Gass, Wilsonville, OR (US); J. David Fulmer, Tualatin, OR (US)

(73) Assignee: SD3, LLC, Wilsonville, OR (US)

(*) Notice: Subject to any disclaimer, the term of this patent is extended or adjusted under 35 U.S.C. 154(b) by 555 days.

(21) Appl. No.: 10/189,031

(22) Filed: Jul. 2, 2002

(65) Prior Publication Data

US 2003/0002942 A1    Jan. 2, 2003

Related U.S. Application Data

(60) Provisional application No. 60/302,937, filed on Jul. 2, 2001.

(51) Int. Cl.
*B26D 5/00* (2006.01)
*B26D 1/14* (2006.01)

(52) U.S. Cl. .......... 83/58; 83/62.1; 83/DIG. 1; 83/477.1; 83/477.2; 83/490; 83/788

(58) Field of Classification Search .......... 83/62.1, 83/58, 471.3, 477.1, 490, 589, 581, 397, 83/397.1, 477.2, 630, 292, 644, DIG. 1, 788, 83/476, 526, 491, 76.8, 72, 485, 487, 546, 83/590, 665; 324/678, 658, 686, 660, 725, 324/706; 408/710; 317/146, 153, DIG. 2, 317/123; 403/2, 28; 307/326, 142, 110, 307/121
See application file for complete search history.

(56) References Cited

U.S. PATENT DOCUMENTS

| | | | |
|---|---|---|---|
| 146,886 A | 1/1874 | Doane et al. | |
| 162,814 A | 5/1875 | Graves et al. | |
| 261,090 A | 7/1882 | Grill | |
| 264,412 A | 9/1882 | Kuhlmann | |
| 299,480 A | 5/1884 | Kuhlmann et al. | |
| 302,041 A | 7/1884 | Sill | |
| 307,112 A | 10/1884 | Groff | |
| 509,253 A | 11/1893 | Shields | |
| 545,504 A | 9/1895 | Hoover | |
| 869,513 A | 10/1907 | Pfeil | |
| 941,726 A | 11/1909 | Pfalzgraf | |
| 997,720 A | 7/1911 | Troupenat | |
| 1,037,843 A | 9/1912 | Ackley | |
| 1,050,649 A | 1/1913 | Harrold et al. | |
| 1,054,558 A | 2/1913 | Jones | |
| 1,074,198 A | 9/1913 | Phillips | |

(Continued)

FOREIGN PATENT DOCUMENTS

CA    2140991    1/1995

(Continued)

OTHER PUBLICATIONS

U.S. Appl. No. 60/157,340, filed Oct. 1, 1999, entitled "Fast-Acting Safety Stop."

(Continued)

*Primary Examiner*—Boyer D. Ashley
*Assistant Examiner*—Ghassem Alie

(57) ABSTRACT

A machine is described having at least one dangerous portion. The machine also includes a safety system to detect dangerous proximity between a person and the dangerous portion and perform a predetermined action to limit or prevent injury to the person from the dangerous portion.

17 Claims, 3 Drawing Sheets

U.S. PATENT DOCUMENTS

| | | |
|---|---|---|
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. ......... 192/130 |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson ....................... 143/17 |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A * | 11/1959 | Simonton et al. ........... 250/393 |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,213,731 A | 10/1965 | Renard |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,306,149 A | 2/1967 | John |
| 3,313,185 A | 4/1967 | Drake et al. |

| | | | | | |
|---|---|---|---|---|---|
| 3,315,715 A | 4/1967 | Mytinger | 4,117,752 A | 10/1978 | Yoneda |
| 3,323,814 A | 6/1967 | Phillips | 4,145,940 A | 3/1979 | Woloveke et al. |
| 3,337,008 A | 8/1967 | Trachte | 4,152,833 A | 5/1979 | Phillips |
| 3,356,111 A | 12/1967 | Mitchell | 4,161,649 A | 7/1979 | Klos et al. |
| 3,386,322 A | 6/1968 | Stone et al. | 4,175,452 A | 11/1979 | Idel |
| 3,439,183 A | 4/1969 | Hurst, Jr. | 4,190,000 A | 2/1980 | Shaull et al. |
| 3,445,835 A * | 5/1969 | Fudaley .................. 340/905 | 4,195,722 A | 4/1980 | Anderson et al. |
| 3,454,286 A | 7/1969 | Anderson et al. | 4,199,930 A | 4/1980 | Lebet et al. |
| 3,456,696 A | 7/1969 | Gregory et al. | 4,206,666 A | 6/1980 | Ashton |
| 3,512,440 A | 5/1970 | Frydmann | 4,249,117 A | 2/1981 | Leukhardt et al. |
| 3,538,964 A | 11/1970 | Warrick et al. | 4,249,442 A | 2/1981 | Fittery |
| 3,540,338 A | 11/1970 | McEwan et al. | 4,262,278 A | 4/1981 | Howard et al. |
| 3,554,067 A | 1/1971 | Scutella | 4,267,914 A | 5/1981 | Saar |
| 3,566,996 A | 3/1971 | Crossman | 4,270,427 A | 6/1981 | Colberg et al. |
| 3,580,376 A | 5/1971 | Loshbough | 4,276,459 A | 6/1981 | Willett et al. |
| 3,581,784 A | 6/1971 | Warrick | 4,276,799 A | 7/1981 | Muehling |
| 3,613,748 A | 10/1971 | De Pue | 4,291,794 A | 9/1981 | Bauer |
| 3,621,894 A | 11/1971 | Niksich | 4,305,442 A | 12/1981 | Currie |
| 3,670,788 A | 6/1972 | Pollak et al. | 4,321,841 A | 3/1982 | Felix |
| 3,675,444 A | 7/1972 | Whipple | 4,372,202 A | 2/1983 | Cameron |
| 3,680,609 A | 8/1972 | Menge | 4,391,358 A | 7/1983 | Haeger |
| 3,688,815 A | 9/1972 | Ridenour | 4,418,597 A | 12/1983 | Krusemark et al. |
| 3,695,116 A | 10/1972 | Baur | 4,427,042 A | 1/1984 | Mitchell et al. |
| 3,696,844 A | 10/1972 | Bernatschek | 4,466,170 A | 8/1984 | Davis |
| 3,719,103 A | 3/1973 | Streander | 4,466,233 A | 8/1984 | Thesman |
| 3,745,546 A | 7/1973 | Struger et al. | 4,470,046 A | 9/1984 | Betsill |
| 3,749,933 A | 7/1973 | Davidson | 4,510,489 A | 4/1985 | Anderson, III et al. |
| 3,754,493 A | 8/1973 | Niehaus et al. | 4,512,224 A * | 4/1985 | Terauchi .................. 82/48 |
| 3,772,590 A | 11/1973 | Mikulecky et al. | 4,518,043 A | 5/1985 | Anderson et al. |
| 3,785,230 A | 1/1974 | Lokey | 4,532,501 A | 7/1985 | Hoffman |
| 3,793,915 A | 2/1974 | Hujer | 4,532,844 A | 8/1985 | Chang et al. |
| 3,805,639 A | 4/1974 | Peter | 4,557,168 A | 12/1985 | Tokiwa |
| 3,805,658 A | 4/1974 | Scott et al. | 4,560,033 A | 12/1985 | DeWoody et al. |
| 3,808,932 A | 5/1974 | Russell | 4,566,512 A | 1/1986 | Wilson |
| 3,829,850 A | 8/1974 | Guetersloh | 4,573,556 A | 3/1986 | Andreasson |
| 3,829,970 A | 8/1974 | Anderson | 4,576,073 A | 3/1986 | Stinson |
| 3,858,095 A | 12/1974 | Friemann et al. | 4,589,047 A | 5/1986 | Gaus et al. |
| 3,861,016 A | 1/1975 | Johnson et al. | 4,589,860 A | 5/1986 | Brandenstein et al. |
| 3,863,208 A | 1/1975 | Balban | 4,599,597 A | 7/1986 | Rotbart |
| 3,880,032 A | 4/1975 | Green | 4,599,927 A | 7/1986 | Eccardt et al. |
| 3,882,744 A | 5/1975 | McCarroll | 4,606,251 A | 8/1986 | Boileau |
| 3,886,413 A | 5/1975 | Dow et al. | 4,615,247 A | 10/1986 | Berkeley |
| 3,889,567 A | 6/1975 | Sato et al. | 4,621,300 A | 11/1986 | Summerer |
| 3,922,785 A | 12/1975 | Fushiya | 4,625,604 A | 12/1986 | Handler et al. |
| 3,924,688 A | 12/1975 | Cooper et al. | 4,637,188 A | 1/1987 | Crothers |
| 3,931,727 A | 1/1976 | Luenser | 4,637,289 A | 1/1987 | Ramsden |
| 3,935,777 A | 2/1976 | Bassett | 4,644,832 A | 2/1987 | Smith |
| 3,945,286 A | 3/1976 | Smith | 4,653,189 A | 3/1987 | Andreasson |
| 3,946,631 A | 3/1976 | Malm | 4,657,428 A | 4/1987 | Wiley |
| 3,947,734 A | 3/1976 | Fyler | 4,672,500 A | 6/1987 | Tholome et al. |
| 3,949,636 A | 4/1976 | Ball et al. | 4,675,664 A * | 6/1987 | Cloutier et al. ............. 340/685 |
| 3,953,770 A | 4/1976 | Hayashi | 4,679,719 A | 7/1987 | Kramer |
| 3,960,310 A | 6/1976 | Nussbaum | 4,722,021 A | 1/1988 | Hornung et al. |
| 3,967,161 A | 6/1976 | Lichtblau | 4,751,603 A | 6/1988 | Kwan |
| 3,974,565 A | 8/1976 | Ellis | 4,757,881 A | 7/1988 | Jonsson et al. |
| 3,975,600 A | 8/1976 | Marston | 4,774,866 A | 10/1988 | Dehari et al. |
| 3,978,624 A * | 9/1976 | Merkel et al. ................ 451/26 | 4,792,965 A | 12/1988 | Morgan |
| 3,994,192 A | 11/1976 | Faig | 4,805,504 A | 2/1989 | Fushiya et al. |
| 4,007,679 A | 2/1977 | Edwards | 4,831,279 A | 5/1989 | Ingraham |
| 4,016,490 A | 4/1977 | Weckenmann et al. | 4,840,135 A | 6/1989 | Yamauchi |
| 4,026,174 A | 5/1977 | Fierro | 4,845,476 A * | 7/1989 | Rangeard et al. ........... 340/660 |
| 4,026,177 A | 5/1977 | Lokey | 4,864,455 A | 9/1989 | Shimomura et al. |
| 4,029,159 A | 6/1977 | Nymann | 4,875,398 A | 10/1989 | Taylor et al. |
| 4,047,156 A | 9/1977 | Atkins | 4,896,607 A | 1/1990 | Hall et al. |
| 4,048,886 A | 9/1977 | Zettler | 4,906,962 A | 3/1990 | Duimstra |
| 4,060,160 A | 11/1977 | Lieber | 4,907,679 A | 3/1990 | Menke |
| 4,070,940 A | 1/1978 | McDaniel et al. | 4,934,233 A | 6/1990 | Brundage et al. |
| 4,075,961 A | 2/1978 | Harris | 4,936,876 A * | 6/1990 | Reyes ........................ 95/6 |
| 4,077,161 A | 3/1978 | Wyle et al. | 4,937,554 A | 6/1990 | Herman |
| 4,085,303 A | 4/1978 | McIntyre et al. | 4,965,909 A | 10/1990 | McCullough et al. |
| 4,090,345 A | 5/1978 | Harkness | 4,975,798 A | 12/1990 | Edwards et al. |
| 4,091,698 A | 5/1978 | Obear et al. | 5,020,406 A | 6/1991 | Sasaki et al. |
| 4,106,378 A | 8/1978 | Kaiser | 5,025,175 A | 6/1991 | Dubois, III |

| | | | | | | |
|---|---|---|---|---|---|---|
| 5,042,348 A | 8/1991 | Brundage et al. | | 5,852,951 A | 12/1998 | Santi |
| 5,046,426 A | 9/1991 | Julien et al. | | 5,861,809 A | 1/1999 | Eckstein et al. |
| 5,052,255 A | 10/1991 | Gaines | | 5,875,698 A | 3/1999 | Ceroll et al. |
| 5,074,047 A | 12/1991 | King | | 5,880,954 A | 3/1999 | Thomson et al. |
| 5,081,406 A | 1/1992 | Hughes et al. | | 5,921,367 A | 7/1999 | Kashioka et al. |
| 5,082,316 A | 1/1992 | Wardlaw | | 5,930,096 A | 7/1999 | Kim |
| 5,083,973 A | 1/1992 | Townsend | | 5,937,720 A | 8/1999 | Itzov |
| 5,086,890 A | 2/1992 | Turczyn et al. | | 5,942,975 A | 8/1999 | Sorensen |
| 5,094,000 A | 3/1992 | Becht et al. | | 5,943,932 A | 8/1999 | Sberveglieri |
| 5,119,555 A | 6/1992 | Johnson | | 5,950,514 A | 9/1999 | Benedict et al. |
| 5,122,091 A | 6/1992 | Townsend | | 5,963,173 A | 10/1999 | Lian et al. |
| 5,174,349 A | 12/1992 | Svetlik et al. | | 5,974,927 A | 11/1999 | Tsune |
| 5,184,534 A | 2/1993 | Lee | | 5,989,116 A | 11/1999 | Johnson et al. |
| 5,198,702 A | 3/1993 | McCullough et al. | | 6,018,284 A | 1/2000 | Rival et al. |
| 5,199,343 A | 4/1993 | OBanion | | 6,037,729 A | 3/2000 | Woods et al. |
| 5,201,684 A | 4/1993 | DeBois, III | | 6,052,884 A | 4/2000 | Steckler et al. |
| 5,207,253 A | 5/1993 | Hoshino et al. | | 6,070,484 A | 6/2000 | Sakamaki |
| 5,212,621 A | 5/1993 | Panter | | 6,095,092 A | 8/2000 | Chou |
| 5,218,189 A | 6/1993 | Hutchison | | 6,119,984 A | 9/2000 | Devine |
| 5,231,359 A | 7/1993 | Masuda et al. | | 6,133,818 A | 10/2000 | Hsieh et al. |
| 5,231,906 A | 8/1993 | Kogej | | 6,141,192 A | 10/2000 | Garzon |
| 5,239,978 A | 8/1993 | Plangetis | | 6,148,504 A | 11/2000 | Schmidt et al. ............... 29/708 |
| 5,245,879 A | 9/1993 | McKeon | | 6,150,826 A | 11/2000 | Hokodate et al. |
| 5,257,570 A | 11/1993 | Shiotani et al. | | 6,170,370 B1 | 1/2001 | Sommerville |
| 5,265,510 A | 11/1993 | Hoyer-Ellefsen | | 6,244,149 B1 | 6/2001 | Ceroll et al. |
| 5,272,946 A | 12/1993 | McCullough et al. | | 6,257,061 B1 | 7/2001 | Nonoyama et al. |
| 5,276,431 A | 1/1994 | Piccoli et al. | | 6,330,848 B1 | 12/2001 | Nishio et al. |
| 5,285,708 A | 2/1994 | Bosten et al. ................. 83/520 | | 6,336,273 B1 | 1/2002 | Nilsson et al. |
| 5,320,382 A | 6/1994 | Goldstein et al. | | 6,352,137 B1 | 3/2002 | Stegall et al. |
| 5,321,230 A | 6/1994 | Shanklin et al. | | 6,366,099 B1 | 4/2002 | Reddi |
| 5,331,875 A | 7/1994 | Mayfield | | 6,376,939 B1 | 4/2002 | Suzuki et al. |
| 5,353,670 A | 10/1994 | Metzger, Jr. | | 6,404,098 B1 | 6/2002 | Kayama et al. |
| 5,377,554 A | 1/1995 | Reulein et al. | | 6,405,624 B2 | 6/2002 | Sutton |
| 5,377,571 A | 1/1995 | Josephs ....................... 83/399 | | 6,418,829 B1 | 7/2002 | Pilchowski |
| 5,392,568 A | 2/1995 | Howard, Jr. et al. | | 6,420,814 B1 | 7/2002 | Bobbio |
| 5,392,678 A | 2/1995 | Sasaki et al. | | 6,427,570 B1 | 8/2002 | Miller et al. |
| 5,401,928 A | 3/1995 | Kelley | | 6,430,007 B1 | 8/2002 | Jabbari |
| 5,411,221 A | 5/1995 | Collins et al. | | 6,431,425 B1 | 8/2002 | Moorman et al. |
| 5,423,232 A | 6/1995 | Miller et al. | | 6,450,077 B1 | 9/2002 | Ceroll et al. |
| 5,436,613 A * | 7/1995 | Ghosh et al. ............. 340/573.1 | | 6,453,786 B1 | 9/2002 | Ceroll et al. |
| 5,451,750 A * | 9/1995 | An .............................. 219/716 | | 6,460,442 B2 | 10/2002 | Talesky et al. |
| 5,453,903 A | 9/1995 | Chow | | 6,471,106 B1 | 10/2002 | Reining |
| 5,471,888 A | 12/1995 | McCormick | | 6,479,958 B1 | 11/2002 | Thompson et al. |
| 5,480,009 A | 1/1996 | Wieland et al. | | D466,913 S | 12/2002 | Ceroll et al. |
| 5,503,059 A | 4/1996 | Pacholok | | 6,492,802 B1 | 12/2002 | Bielski |
| 5,510,587 A | 4/1996 | Reiter | | D469,354 S | 1/2003 | Curtsinger |
| 5,510,685 A | 4/1996 | Grasselli | | 6,502,493 B1 | 1/2003 | Eccardt et al. |
| 5,513,548 A | 5/1996 | Garuglieri | | 6,536,536 B1 | 3/2003 | Gass et al. |
| 5,531,147 A | 7/1996 | Serban | | 6,543,324 B2 | 4/2003 | Dils |
| 5,534,836 A | 7/1996 | Schenkel et al. | | 6,546,835 B2 | 4/2003 | Wang |
| 5,572,916 A | 11/1996 | Takano | | 6,575,067 B2 | 6/2003 | Parks et al. |
| 5,587,618 A | 12/1996 | Hathaway | | 6,578,460 B2 | 6/2003 | Sartori |
| 5,592,353 A | 1/1997 | Shinohara et al. | | 6,578,856 B2 | 6/2003 | Kahle |
| 5,606,889 A | 3/1997 | Bielinski et al. | | 6,595,096 B2 | 7/2003 | Ceroll et al. |
| 5,623,860 A | 4/1997 | Schoene et al. | | D478,917 S | 8/2003 | Ceroll et al. |
| 5,648,644 A | 7/1997 | Nagel | | 6,601,493 B1 | 8/2003 | Crofutt |
| 5,659,454 A | 8/1997 | Vermesse | | 6,607,015 B1 | 8/2003 | Chen |
| 5,667,152 A | 9/1997 | Mooring | | D479,538 S | 9/2003 | Welsh et al. |
| 5,671,633 A | 9/1997 | Wagner | | 6,617,720 B1 | 9/2003 | Egan, III et al. |
| 5,695,306 A | 12/1997 | Nygren, Jr. | | 6,619,348 B2 | 9/2003 | Wang |
| 5,700,165 A | 12/1997 | Harris et al. | | 6,640,683 B2 | 11/2003 | Lee |
| 5,724,875 A | 3/1998 | Meredith et al. | | 6,644,157 B2 | 11/2003 | Huang |
| 5,730,165 A | 3/1998 | Philipp | | 6,647,847 B2 | 11/2003 | Hewitt et al. |
| 5,741,048 A | 4/1998 | Eccleston | | 6,659,233 B2 | 12/2003 | DeVlieg |
| 5,755,148 A | 5/1998 | Stumpf et al. | | 6,734,581 B1 | 5/2004 | Griffis |
| 5,771,742 A | 6/1998 | Bokaie et al. | | 6,742,430 B2 | 6/2004 | Chen |
| 5,782,001 A | 7/1998 | Gray | | 6,796,208 B1 | 9/2004 | Jorgensen |
| 5,787,779 A | 8/1998 | Garuglieri | | 6,826,988 B2 | 12/2004 | Gass et al. |
| 5,791,057 A | 8/1998 | Nakamura et al. ............ 30/381 | | 6,857,345 B2 | 2/2005 | Gass et al. |
| 5,791,223 A | 8/1998 | Lanzer | | 6,874,397 B2 | 4/2005 | Chang |
| 5,791,224 A | 8/1998 | Suzuki et al. | | 6,874,399 B2 | 4/2005 | Lee |
| 5,791,441 A | 8/1998 | Matos et al. | | 6,883,397 B2 | 4/2005 | Kimizuka |
| 5,819,619 A | 10/1998 | Miller et al. | | 6,889,585 B1 | 5/2005 | Harris et al. |

| | | |
|---|---|---|
| 6,920,814 B2 | 7/2005 | Gass et al. |
| 6,945,148 B2 | 9/2005 | Gass et al. |
| 6,945,149 B2 | 9/2005 | Gass et al. |
| 2001/0032534 A1 | 10/2001 | Cerroll et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0088325 A1 | 7/2002 | Talesky et al. |
| 2002/0096030 A1 | 7/2002 | Wang |
| 2002/0109036 A1 | 8/2002 | Denen et al. |
| 2002/0134212 A1 | 9/2002 | Ceroll et al. |
| 2002/0170399 A1 | 11/2002 | Gass et al. |
| 2002/0170400 A1 | 11/2002 | Gass |
| 2002/0174755 A1 | 11/2002 | Behne et al. |
| 2002/0190581 A1 | 12/2002 | Gass et al. |
| 2003/0000359 A1 | 1/2003 | Eccardt et al. |
| 2003/0005588 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0074873 A1 | 4/2003 | Freiberg et al. |
| 2003/0089212 A1 | 5/2003 | Parks et al. |
| 2003/0101857 A1 | 6/2003 | Chuang |
| 2003/0109798 A1 | 6/2003 | Kermani |
| 2003/0213349 A1 | 11/2003 | Chang |
| 2004/0011177 A1 | 1/2004 | Huang |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0123960 A1 | 6/2006 | Gass et al. |
| 2006/0123964 A1 | 6/2006 | Gass et al. |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of US patent applications referenced in the form are from U.S. Appl. No. 60/157,340, filed Oct. 1, 1999, and U.S. Appl. No. 60/182,866, filed Feb. 16, 2000).

Gordon Engineering Corp., Product Catalog, Oct. 1997, pp. cover, 1, 3 and back, Brookfield, Connecticut, US.

*You Should Have Invented It*, French television show video.

Skil Model 3400-Type 1 10" Table Saw Parts List and Technical Bulletin, S-B Power Tool Company, Jun. 1993.

Shop Fox® Fence Operating Manual, Woodstock International, Inc., 1996, revised May 1997.

Analog Devices, Inc., 3-Axis Capacitive Sensor—Preliminary Technical Data AD7103, pp. 1-40, © 1998.

Excaliber T-Slot Precision Saw Fence Model TT45 Owner's Manual, Sommerville Design & Manufacturing, Inc., May 2000.

Bosch Model 4000 Worksite Table Saw Operating/Safety Instructions, S-B Power Tool Company, Jul. 2000.

XACTA Fence II™ Homeshop 30/52 Owner's Manual, JET Equipment & Tools, Mar. 2001.

XACTA Fence II™ Commercial 30/50 Owner's Manual, JET Equipment & Tools, Mar. 2001.

Bosch 10" Table Saw Model 0601476139 Parts List and Technical Bulletin, S-B Power Tool Company, Apr. 2001.

Biesemeyer® T-Square® Universal Home Shop Fence system Instruction Manual, Delta Machinery, Jun. 1, 2001.

Powermatic 10" Tilting Arbor Saw Model 66 Instruction Manual & Parts List, JET Equipment & Tools, Jun. 2001.

Skil Model 3400 Table Saw Operating/Safety Instructions, S-B Power Tool Company, Sep. 2001.

Tablesaw Splitters and Blade Covers, *Fine Woodworking*, pp. 77-81, Dec. 2001.

The Merlin Splitter by Excalibur a Sommerville Design Product Overview & Generic Installation Notes, Sommerville Design & Manufacturing Inc., at least as early as 2002.

INCRA Incremental Micro Precision Table Saw Fence Owner's Manual, Taylor Design Group, Inc., 2003.

Shop Fox® Models W2005, W2006, W2007 Classic Fence Instruction Manual, Woodstock International, Jan. 2000, revised Mar. 2004.

ACCU-FENCE® 64A Fence and Rail System Owner's Manual, WMH Tool Group, Sep. 2004.

Unifence™ Saw Guide Instruction Manual, Delta Machinery, Feb. 22, 2005.

Biesemeyer® T-Square® Commercial Fence System Instruction Manual, Delta Machinery, May 2, 2005.

Young Inventor: Teen's Device Earns Her Trip to Science Fair, *The Arizona Republic*, May 5, 2006.

Operator Injury Mitigation Using Electronic Sensing and Mechanical Braking and Decoupling Devices in Handheld Circular Saws, Erin F. Eppard, date unknown.

Laguna Tools table saw owner's manual, date unknown.

* cited by examiner

DISCRETE PROXIMITY DETECTION SYSTEM

CROSS-REFERENCE TO RELATED APPLICATION

This application claims the benefit of and priority from U.S. Provisional Patent Application Ser. No. 60/302,937, filed Jul. 2, 2001, which is hereby incorporated by reference.

FIELD

The present invention relates to systems for discretely detecting the proximity of a human to sensor and, in more specific embodiments, for discretely detecting the proximity of a human to a dangerous portion of a piece of power equipment.

BACKGROUND

Safety systems often must be able to detect the presence of a human body or some portion thereof in a dangerous location. For instance, interruption of a beam in a light curtain is used to sense the presence of an operator near a dangerous machine. When the beam is broken, the machine can be shut down automatically to reduce the chance of injury. Light curtains, however, are limited to protecting areas that can be bounded by planar surfaces, and that will not be penetrated by any object, not just humans. However, there are many instances where workpieces must enter an area that cannot be protected by a light curtain because the light curtain cannot distinguish between a human and a workpiece.

As a solution to the problem of distinguishing work pieces from humans, numerous radio frequency proximity detection systems have been developed. The radio-frequency systems create a radio-frequency electric field in a protected area that is altered when some part of a human body enters the area. A limitation with such systems is that they are not very discrete in detection. More specifically, it is very difficult to precisely define the protection area with radio-frequency systems. Typically, the system cannot determine the distance to the body accurately and therefore a hand or body at long range may generate the same signal change as a finger in closer proximity. As a result, radio-frequency systems are prone to false trips or may miss actual dangerous conditions.

In view of the limitations of the prior art detection systems, it would be desirable to have a system that could reliably and discretely detect proximity between a user and a dangerous location prior to actual contact.

DETAILED DESCRIPTION

Figure 1:
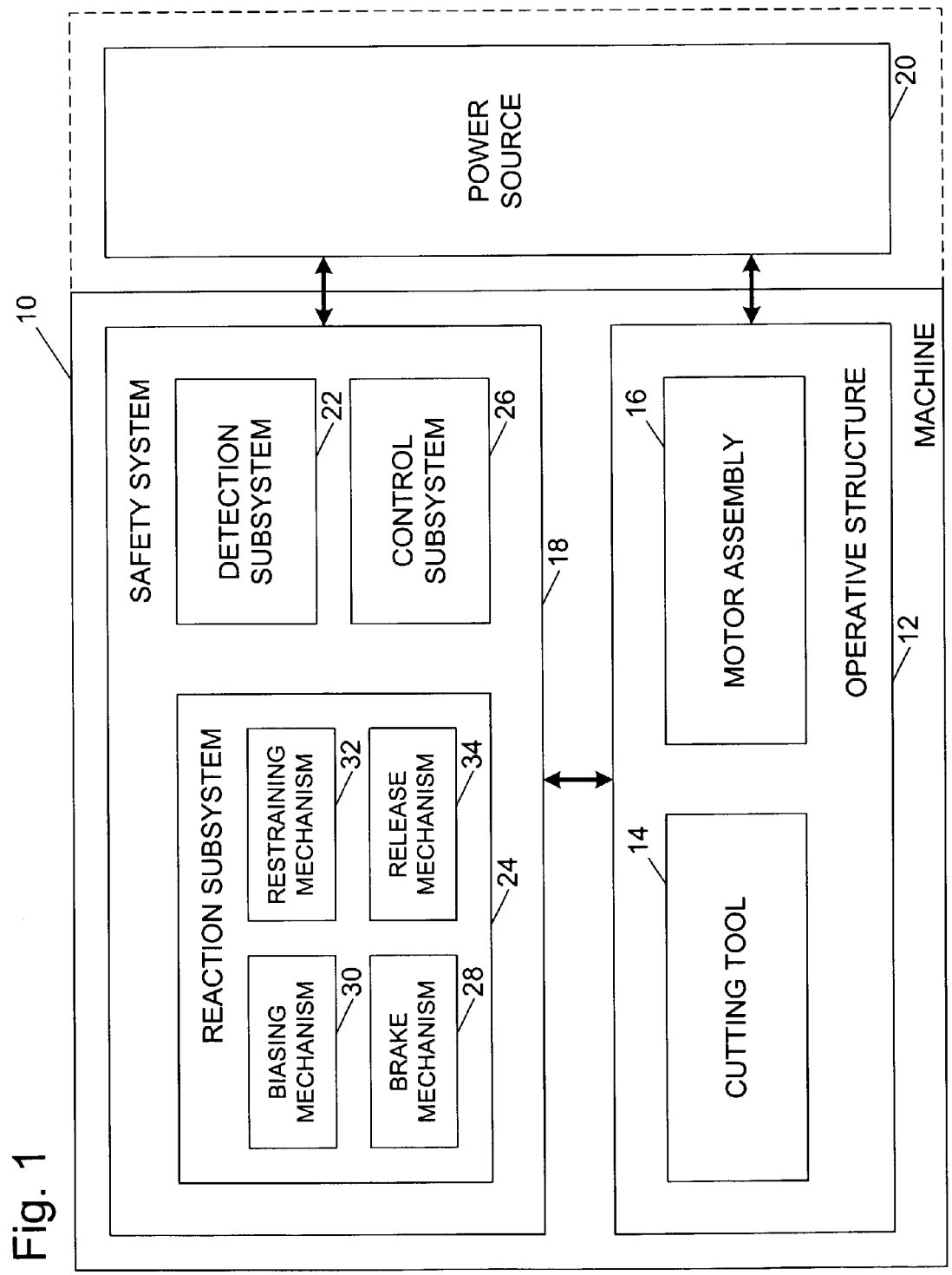
FIG. 1 is a schematic block diagram of a machine with a fast-acting safety system.

A machine according to the present invention is shown schematically in FIG. 1 and indicated generally at 10. Machine 10 may be any of a variety of different types and configurations of machine adapted for cutting workpieces, such as wood, plastic, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14. In the case of chop saws, operative structure 12 typically takes the form of an arbor block pivotally coupled to a base or frame. Cutting tool 14 is mounted on the arm and pivotal upward toward a workpiece supported by the base.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, and U.S. Pat. No. 4,267,914, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, the disclosure of which is herein incorporated by reference. Retraction of the cutting tool from its operating position is described in more detail in U.S. Provisional Patent Application Ser. No. 60/225,089, filed Aug. 14, 2000, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
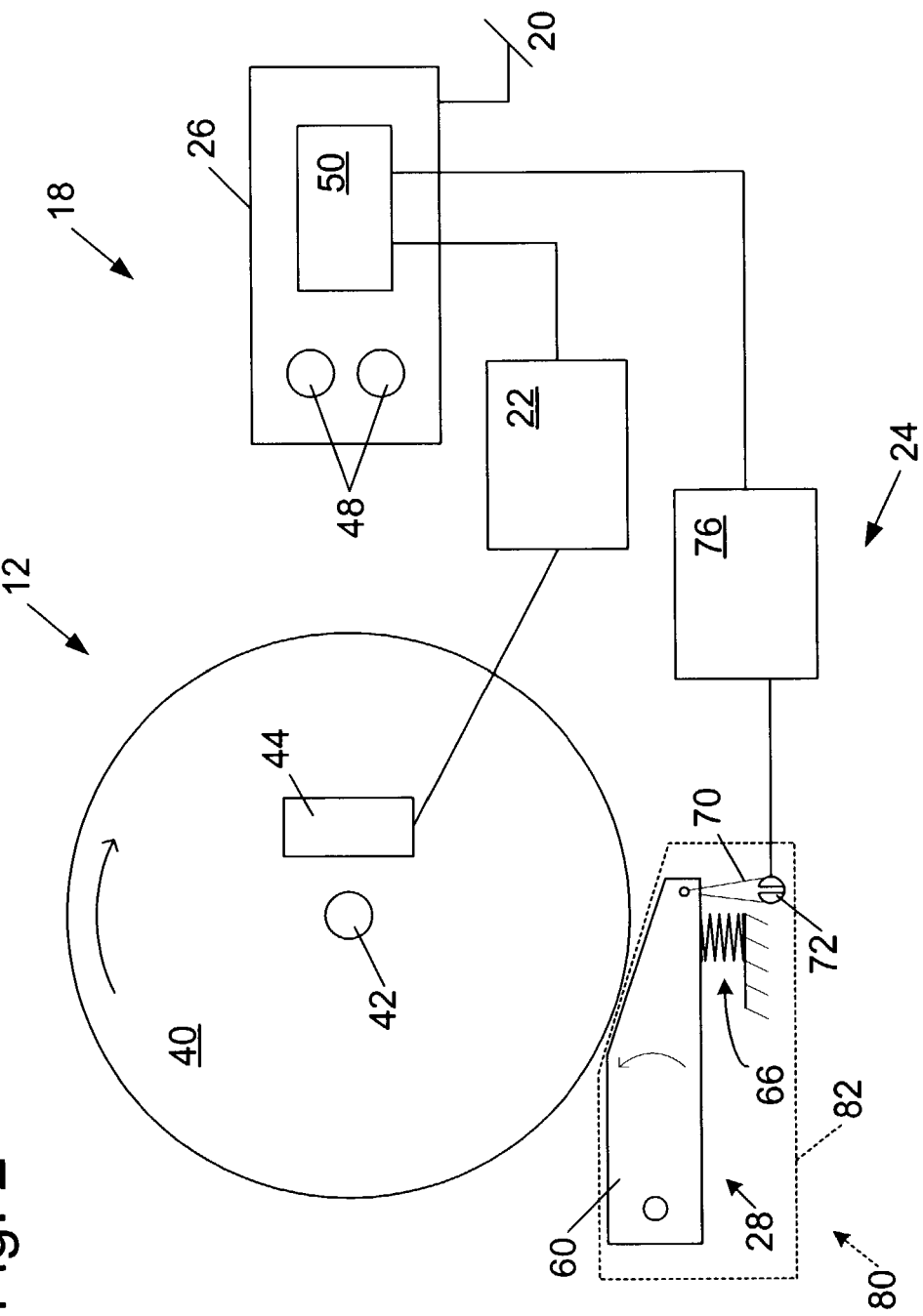
FIG. 2 is a schematic diagram of an exemplary safety system in the context of a machine having a circular blade, and configured to detect dangerous proximity between a person and the blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of machine 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop rotation of the blade.

In the exemplary implementation, detection subsystem 22 is adapted to detect the dangerous condition of the user coming into close proximity to blade 40. The detection subsystem operates by imparting through a connection 44 a high voltage charge to blade 40 and watching for the electrical discharge that will occur when the user's hand approaches the blade closely enough that the electric field between the user and the blade will exceed the dielectric breakdown strength of the air separating the blade and the user.

Typically, the blade, or some larger portion of cutting tool 14, is electrically isolated from the remainder of machine 10 to permit creation of the electrical charge on the blade. Alternatively, detection subsystem 22 may include a different sensor assembly configured to detect proximity in other ways, such as optically, resistively, etc. In any event, the detection subsystem is adapted to transmit a signal to control subsystem 26 when dangerous proximity between the user and the blade is detected. Various exemplary embodiments and implementations of alternative detection subsystem 22 are described in more detail in U.S. Provisional Patent Application Ser. No. 60/225,200, filed Aug. 14, 2000, U.S. Provisional Patent Application Ser. No. 60/225,211, filed Aug. 14, 2000, and U.S. Provisional Patent Application Ser. No. 60/270,011, filed Feb. 20, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000 and U.S. Provisional Patent Application Ser. No. 60/225,094, filed Aug. 14, 2000, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. Provisional Patent Application Ser. No. 60/225,169, filed Aug. 14, 2000, and U.S. Provisional Patent Application Ser. No. 60/225,170, filed Aug. 14, 2000, the disclosures of which are herein incorporated by reference.

It will be appreciated that activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction subsystem has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000 and U.S. Provisional Patent Application Ser. No. 60/225,212, filed Aug. 14, 2000, the disclosures of which are herein incorporated by reference.

In the case of miter saws, chop saws, radial arm saws, and other power equipment in which a cutting tool moves toward and into a workpiece to cut the workpiece, reaction subsystem 24 may include a system to stop the cutting tool from continuing to move into the workpiece. Stopping the translational motion of the cutting tool can prevent or minimize any injury from accidental contact between a user and the cutting tool.

Connection 44 may take many different forms. For example, connection 44 may take the form of a conductive slip ring or conductive brush in direct contact with the blade, or some member electrically coupled to the blade, such as the arbor. It should be noted that the term blade is used for convenience, but the actual element which is used as the sensor may be a blade, some other type of cutter, guard, or some other member placed where proximity by a user's body would be indicative of a dangerous condition. As another example, connection 44 may be a relatively short air gap. As voltage is applied, the charge can jump a short gap to charge the blade. The gap should preferably be substantially smaller than the desired detection distance at which the user's finger or hand should be detected. Typical gaps would be less than 1 mm. Connection 44 may also be capacitive as described in U.S. Provisional Application Ser. No. 60/225,211, filed Aug. 14, 2000. In addition, blade 40 may be electrically isolated in any suitable fashion, such as disclosed in the above-cited case. It should be noted that the isolation of the blade should be sufficient to prevent dielectric breakdown and resultant arcing at any point between the blade or other isolated members and grounded portions of the saw.

Figure 3:
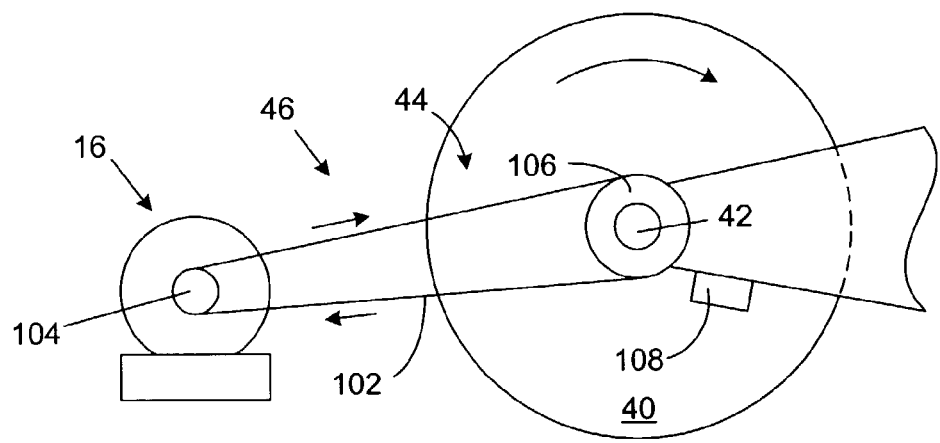
FIG. 3 is a schematic partial side view of a machine having a high voltage generation system in the form of a drive belt coupling between a motor and a blade.

Detection subsystem 22 includes a high voltage generation system 46 to create a high voltage to be applied to the blade through coupling 44. As shown in FIG. 3, the simplest high voltage generation system and coupling may be an insulated belt 102 running between a motor pulley 104 and an arbor pulley 106. With the proper triboelectric selection of materials, this arrangement can act like a Van De Graff generator to impart a high voltage static charge to blade 40. In this configuration, it may be desirable to have a charge dissipation element 108 connected to the blade to limit the charge build up on the blade. This might be a surge suppression device, such as a transient voltage suppressor Zener diode, to divert charge after a desired voltage has been established on the blade, or a resistor to dissipate charge at a known rate so that the equilibrium voltage on the blade is at the desired level. Alternatively, a safety gap formed by two closely-spaced electrodes, one associated with the blade and the other with ground, may be used to limit the blade voltage. When the blade voltage exceeds the arc-over distance between the electrodes, arcing will occur and the blade voltage will be reduced.

Figure 4:
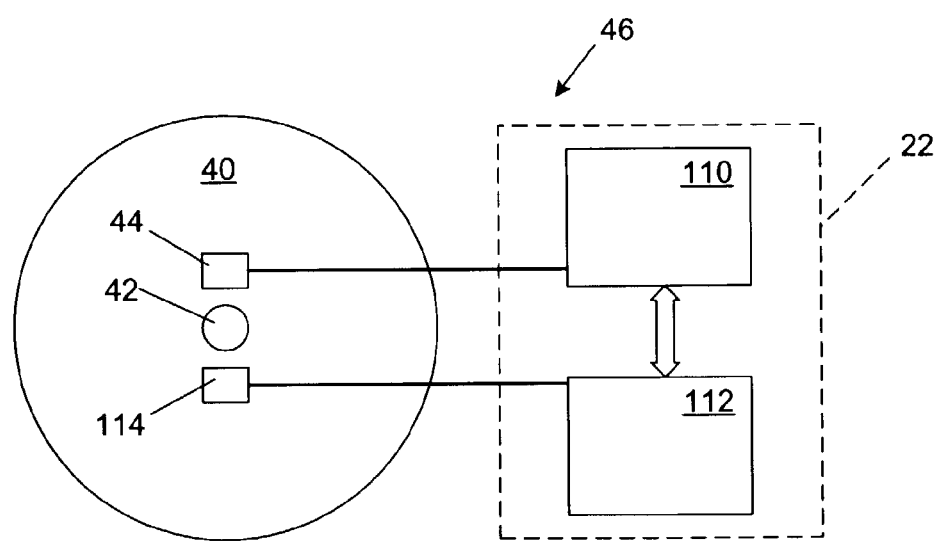
FIG. 4 is a schematic diagram of an alternative high voltage generation system.

In an alternative embodiment illustrated in FIG. 4, high voltage generation system 46 incorporates a high voltage power supply 110 to generate a known voltage. Power supply 110 is coupled to impart a high voltage signal to blade 40 through a coupling 44. As described above, coupling 44 may be configured to couple the high voltage power supply directly to the blade, or indirectly through some other component such as arbor 42 that is electrically coupled to the blade.

Power supply 110 may be any of a variety of suitable high voltage power supplies such as are well known in the art. Examples of suitable power supplies include those found in electronic ignitions, flyback transformer supplies such as are used in CRTs, spark gap circuits such as are used in tazers, etc. Alternatively, power supply 110 may be a regulated high voltage power supply such as a Bertan Model 605C-200P, N 0-20 kV 250 microamp power supply or similar power supply. It will be appreciated that the particular supply chosen will depend on the application voltage, current and other characteristics required.

The voltage applied to the blade may be a DC voltage that could be applied either continuously or intermittently. Alternatively, the voltage may be AC and applied continuously or in intermittent alternating sign DC pulses. The intermittent application may be useful where there is a relatively high-resistance grounding path connecting the blade to a grounded member of the machine. For instance, work pieces such as wet or green wood may provide a path to ground that could discharge a DC voltage from the blade at a greater rate than could be safely maintained at high voltage. By applying a pulsed signal of single or alternative sign and looking at the peak pulse voltage or behavior near peak, the effect of discharge through green wood or other parasitic conductive path can be minimized.

If the voltage is pulsed, the frequency of pulsing is preferably at least 100 cycles per second (CPS), and more preferably 500–5000 CPS. As the cycle rate goes down, the required detection distance must increase to insure that the reaction system can protect the user adequately. For instance, at 100 CPS, the user may approach within the detection distance for up to 10 ms before a pulse occurs. This may represent a travel distance of 5 mm or more. Thus if the detection distance is 3 mm, the user could have already reached the blade, prior to detection. Thus, the cycle rate should be chosen to insure safe detection in view of the expected detection distance and approach velocity.

The voltage applied to the blade is selected to create a dielectric breakdown between the user and the blade at a desired distance. The typical dielectric breakdown strength of air is about 30,000 volts per centimeter. Thus, if the desired detection distance is 5 mm, the voltage applied should be approximately 15,000 volts. Typical voltages would range between 300 and 60,000 volts and more preferably between 3,000 and 12,000 volts. These ranges will provide detection distances between approximately 0.1 mm and approximately 20 mm and between approximately 1 and approximately 4 mm, respectively, although the exact breakdown distances are dependent on electrode shape—finger/hand/body and blade—and air conditions such as humitity and dust contamination. Fortunately, the sharp points on the teeth of a saw blade tend to concentrate the electric field and therefore decrease the voltage necessary to generate an arc to the user. Depending on the application it may be desirable to alternate the sign of the applied voltage so that if the user's body has a static charge relative to ground, the voltage will be additive at least on one sign of the high voltage, thereby insuring reliable detection.

As shown in FIG. 4, detection subsystem 22 also includes a static discharge detection system or module 112. The static discharge detection module is coupled to a sensor assembly 114 adapted to detect a static discharge between the blade and a human body. Sensor assembly 114 is coupled to sense the voltage on blade 40 either directly, or indirectly through some other component such as arbor 42 that is electrically coupled to the blade. The coupling may be either conductive or capacitive. In any event, discharge detection module 112 is configured to monitor the voltage on the blade and detect any change in voltage due to a static discharge event. In one exemplary embodiment, the discharge detection module is configured to monitor the voltage on the blade and compare the detected voltage to the expected voltage. In other words, the voltage sensed by the discharge detection module is correlated with the voltage imparted by the high voltage generation system. If the sensed voltage departs from an expected voltage greater than a threshold amount, a discharge event is detected. It will be appreciated that the expected voltage will depend on the magnitude, frequency and polarity of the applied voltage, and may be a value that varies with time.

In addition to detecting that a discharge has occurred, it is also possible to gather information from the sign of the discharge pulse. For instance, depending on the triboelectric properties of static-creating objects in proximity to the machine, including the user, it may be that static discharges to the blade will occur due to events other than close proximity of the user. However, in some cases it will be possible to use the sign of the discharge pulse to distinguish these events from human proximity discharges.

In addition to looking at the sign of the discharge, in some cases it will be possible to distinguish human proximity discharges from other events by looking at the discharge rate. In particular, the conductivity of the human body will create a discharge rate within a predetermined range. Human Body Model tests typically represent a human body as having a resistance of 1500 ohms and a capacitance of 100 picofarads for static discharge testing. Other types of parasitic discharges, such as might occur through wet or green wood, will typically exhibit different discharge rates. By monitoring the discharge current directly or through monitoring the rate of change of voltage on the blade, it is possible to distinguish certain types of non-human discharges from discharges indicative of a dangerous proximity.

Other properties of the discharge pulse can also be used to more reliably distinguish dangerous conditions from incidental or parasitic discharges. For instance, the rise time of the current of the discharge pulse may vary with the approach speed of the body to the blade. Therefore, by analyzing the rise rate of the discharge current, under some circumstances it will be possible to measure the approach speed and therefore evaluate the danger. In addition, with a relatively high frequency pulsed voltage, several samples may be taken to further characterize the danger. For instance, subsequent samples may show that the hand is no longer approaching the blade or is approaching more rapidly. In such case, the safety system may be configured not to react (or to react differently) if it determines the user's hand is moving away from the blade.

While detection subsystem 22 has been described above in the general context of a woodworking machine having a circular saw blade, it will be appreciated that the detection subsystem described herein may be adapted for use with a wide variety of different machines having a variety of different configurations. Furthermore, detection subsystem 22 may be incorporated into a variety of different configurations of safety system 18. Examples of such other configurations of machine 10 and/or safety system 18 are described in the references incorporated above, as well in the following patent applications which are incorporated herein by reference: PCT Patent Application Ser. No. PCT/US00/26812, filed Sep. 29, 2000; U.S. patent application Ser. No. 09/676,190, filed Sep. 29, 2000; U.S. Provisional Patent Application Ser. No. 60/298,207, filed Jun. 13, 2001; U.S. Provisional Patent Application Ser. No. 60/292,100, filed May 17, 2001; U.S. Provisional Patent Application Ser. No. 60/292,081, filed May 17, 2001; U.S. Provisional Patent Application Ser. No. 60/279,313, filed Mar. 27, 2001; U.S. Provisional Patent Application Ser. No. 60/275,595, filed Mar. 13, 2001; U.S. Provisional Patent Application Ser. No. 60/275,594, filed Mar. 13, 2001; U.S. Provisional Patent Application Ser. No. 60/273,902, filed Mar. 6, 2001; U.S. Provisional Patent Application Ser. No. 60/273,178, filed Mar. 2, 2001; U.S. Provisional Patent Application Ser. No. 60/273,177, filed Mar. 2, 2001; U.S. Provisional Patent Application Ser. No. 60/270,942, filed Feb. 22, 2001; U.S. Provisional Patent Application Ser. No. 60/270,941, filed Feb. 22, 2001; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

We claim:

1. For use on power equipment having at least one dangerous portion, a method of detecting dangerous proximity between a person and the dangerous portion, the method comprising:
   generating a high voltage;
   applying the high voltage to the dangerous portion, where the high voltage is sufficient to cause an electrical discharge arc between the dangerous portion and the person's body when a portion of the person's body comes within a predetermined distance from the dangerous portion, and where the high voltage on the dangerous portion has an expected amplitude;

providing an electronic circuit adapted to detect when an electrical discharge arc between the dangerous portion and the person's body occurs by monitoring the voltage amplitude on the dangerous portion;

detecting through the electronic circuit when an electrical discharge arc between the dangerous portion and the person's body occurs by monitoring the voltage amplitude on the dangerous portion and comparing that voltage amplitude with the expected amplitude; and triggering an action to mitigate potential injury when the monitored voltage amplitude departs from the expected amplitude greater than a predetermined threshold amount.

2. The method of claim 1, where the power equipment is a woodworking machine and the dangerous portion is a cutting tool.

3. The method of claim 1, where the limitation of generating a high voltage includes generating a DC voltage.

4. The method of claim 3, where the step limitation of generating a high voltage includes generating an intermittent DC voltage.

5. The method of claim 1, where the step limitation of generating a high voltage includes generating an AC voltage.

6. The method of claim 1, where the predetermined distance is at least approximately 0.1 millimeter and less than approximately 20 millimeters.

7. The method of claim 1, where the predetermined distance is at least approximately 1 millimeter and less than approximately 4 millimeters.

8. The method of claim 1, where the high voltage is generated by an electronic ignition type high voltage power supply.

9. The method of claim 1, where the high voltage is generated by a flyback transformer type high voltage power supply.

10. The method of claim 1, where the high voltage is generated by a spark gap circuit type high voltage power supply.

11. The method of claim 1, where the high voltage is generated by a regulated high voltage power supply.

12. The method of claim 1, where the high voltage is pulsed and the frequency of pulsing is at least 100 cycles per second.

13. The method of claim 1, where the high voltage is pulsed and the frequency of pulsing is at least 500 cycles per second.

14. The method of claim 1, where the sign of the high voltage is alternated.

15. The method of claim 1, where the limitation of detecting through the electronic circuit when an electrical discharge arc between the dangerous portion and the person's body occurs senses the sign of the electric discharge.

16. The method of claim 1, where the limitation of detecting through the electronic circuit when an electrical discharge arc between the dangerous portion and the persons body occurs senses the rate of the electric discharge.

17. The method of claim 1, where the limitation of detecting through the electronic circuit when an electrical discharge arc between the dangerous portion and the person's body occurs senses the rise time of the current of the electric discharge.

* * * * *